US012461714B2

(12) United States Patent
Balineni et al.

(10) Patent No.: US 12,461,714 B2
(45) Date of Patent: Nov. 4, 2025

(54) SYSTEM AND METHOD FOR GENERATING A SIMILARITY MATRIX/SCORE BETWEEN INTENDED REQUIREMENTS CONTEXT DATA AND SOURCE CODE CONTEXT DATA

(71) Applicant: JPMorgan Chase Bank, N.A., New York, NY (US)

(72) Inventors: Sreemannarayana Balineni, Hyderabad (IN); Pushpendra Rathore, Bikaner (IN); Shaily Bhagwani, Raiper (IN); Priyatam Naravajhula, Hyderabad (IN); KrishnaPrashanth Dharanikota, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 484 days.

(21) Appl. No.: 17/648,023

(22) Filed: Jan. 14, 2022

(65) Prior Publication Data

US 2023/0161562 A1 May 25, 2023

(30) Foreign Application Priority Data

Nov. 19, 2021 (IN) .............................. 202111053306

(51) Int. Cl.
*G06F 8/30* (2018.01)
(52) U.S. Cl.
CPC ...................... *G06F 8/30* (2013.01)
(58) Field of Classification Search
CPC ................. G06F 8/10; G06F 8/30; G06F 8/36
(Continued)

(56) References Cited

U.S. PATENT DOCUMENTS

| 7,529,818 B2* | 5/2009 | Halpern et al. ...... G06F 9/44505 709/221 |
| 2006/0037019 A1* | 2/2006 | Austin et al. ............ G06F 8/10 718/100 |

(Continued)

OTHER PUBLICATIONS

M. M. Islam and R. Iqbal, "SoCeR: A New Source Code Recommendation Technique for Code Reuse," 2020 IEEE 44th Annual Computers, Software, and Applications Conference (COMPSAC), Madrid, Spain, 2020, pp. 1552-1557. (Year: 2020).*

*Primary Examiner* — Andrew M. Lyons
(74) *Attorney, Agent, or Firm* — Greenblum & Bernstein, P.L.C.

(57) ABSTRACT

Various methods, apparatuses/systems, and media for developing an application are disclosed. A processor converts requirements data into a first semantic context data, the requirements data describing intended tasks required for developing an application; converts the first semantic context data into a first semantic context vector; accesses a database that stores source code corresponding to implementation of the intended tasks required for developing the application; converts the source code into a second semantic context data; converts the second semantic context data into a second semantic context vector; compares the first semantic context vector and the second semantic context vector; automatically generates, in response to comparing, a similarity score that indicates how much the source code and the requirements data are in line with each other; and executes development of the application when it is determined that the similarity score is equal to or more than a predetermined threshold value.

20 Claims, 7 Drawing Sheets

(58) Field of Classification Search
USPC .......................................................... 717/106
See application file for complete search history.

(56) References Cited

U.S. PATENT DOCUMENTS

| | | | | |
|---|---|---|---|---|
| 2009/0300060 | A1* | 12/2009 | Beringer et al. | G06F 8/36 |
| 2014/0244623 | A1* | 8/2014 | King | G06F 8/30 |
| | | | | 707/722 |
| 2017/0371626 | A1* | 12/2017 | Abebe | G06Q 10/06313 |
| 2021/0279115 | A1* | 9/2021 | Aspro | G06F 8/30 |
| 2022/0091825 | A1* | 3/2022 | Mohiseen | G06F 8/20 |
| 2022/0244937 | A1* | 8/2022 | Prasad | G06N 5/022 |
| 2022/0365776 | A1* | 11/2022 | Ramsl et al. | G06F 8/73 |
| 2023/0070420 | A1* | 3/2023 | Moran | G06F 8/427 |

* cited by examiner

SYSTEM AND METHOD FOR GENERATING A SIMILARITY MATRIX/SCORE BETWEEN INTENDED REQUIREMENTS CONTEXT DATA AND SOURCE CODE CONTEXT DATA

CROSS-REFERENCE TO RELATED APPLICATIONS

This application claims the benefit of priority from Indian Provisional Patent Application No. 202111053306, filed Nov. 19, 2021, which is herein incorporated by reference in its entirety.

TECHNICAL FIELD

This disclosure generally relates to application development, and, more particularly, to methods and apparatuses for generating a similarity matrix/score between intended requirements context data and source code context data to be utilized in developing an application.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Application development in the Internet-era has grown increasingly complex. Software applications must not only handle and process complex calculations and tasks, but must be able to accurately and efficiently process a large variety of data types and data content. As software application becomes increasingly more complex, development, test, release, and management of such software application also become more complex as a large number of unique combinations of paths and modules may be tested, released, and managed for each software application. Conventional tools exist for developing, testing and releasing application which generally require a significant amount of manual effort. Automation is an important aspect in any application development, test, and maintenance and at the same time it is also time consuming to write scripts and maintain those.

For example, during process of delivering any application, there may be high probability that what was intended to be done and what is delivered has some differences due to involvement of a number of stockholders in between. Typically, in many cases, the requirements for application developments (i.e., JIRA stories) are not properly written to describe what was expected out of any application delivery. Conventional tools lack capabilities in reducing this gap and improving the application delivery cycle with streamlined audit process. For example, Jules may provide a CICD (continuous integration continuous delivery) pipeline for application development and testing. Jenkins may also offer a free and open source automation server, which may help automate parts of software development related to developing, testing, and deploying, facilitating continuous integration and continuous delivery.

However, these conventional tools do not provide any platform that may reduce the gap between what was intended to be done for an application and what is actually delivered as a final product.

SUMMARY

The present disclosure, through one or more of its various aspects, embodiments, and/or specific features or sub-components, provides, among other features, various systems, servers, devices, methods, media, programs, and platforms for implementing a language agnostic application development module/tool/framework that is configured for automatically generating a similarity matrix between intended requirements context data and source code context data and providing code suggestion, code improvement, percentage completion of intended tasks, code accuracy in developing an application, but the disclosure is not limited thereto. According exemplary embodiments, this similarity matrix measures the degree of correctness and adherence of code to a given intended task for developing the application.

In a case where requirements data for developing an application is not complete, the present disclosure, through one or more of its various aspects, embodiments, and/or specific features or sub-components, also provides, among other features, various systems, servers, devices, methods, media, programs, and platforms for implementing a language agnostic application development module/tool/framework that is configured for providing the intended correct requirements data based on the completed source code, but the disclosure is not limited thereto.

In addition, the present disclosure, through one or more of its various aspects, embodiments, and/or specific features or sub-components, also provides, among other features, various systems, servers, devices, methods, media, programs, and platforms for implementing a language agnostic application development module/tool/framework that is configured for recommending the nearest/closet code snippet's from a code repository based on the semantic context; proposing design document and estimated efforts for completion based on the semantic context; automatically updating/amending of acceptance criteria based on code commit by a developer; validating the semantic context of requirements data and code check-in's and providing a percentage of development completion, etc., but the disclosure is not limited thereto.

According to an aspect of the present disclosure, a method for automatically generating a similarity matrix/score between intended requirements context data and source code context data corresponding to developing an application by utilizing one or more processors and one or more memories is disclosed. The method may include: converting requirements data into a first semantic context data, wherein the requirements data describes intended tasks required for developing an application; converting the first semantic context data into a first semantic context vector; accessing a database that stores source code corresponding to implementation of the intended tasks required for developing the application; converting the source code into a second semantic context data; converting the second semantic context data into a second semantic context vector; comparing the first semantic context vector and the second semantic context vector; automatically generating, in response to comparing, a similarity score that indicates how much the source code and the requirements data are in line with each other; and executing development of the application when it is determined that the similarity score is equal to or more than a predetermined threshold value.

According to yet another aspect of the instant disclosure, the source code may include one or more of the following codes: code developed in fulfilling the intended tasks; and pre-given code that is needed to be modified for developing the application, but the disclosure is not limited thereto.

According to a further aspect of the instant disclosure, the first semantic context data may include one or more of the following data: data defining technical context in developing the application; data validating intended tasks readiness for execution in developing the application; data identifying duplicate intended tasks in developing the application, but the disclosure is not limited thereto.

According to an additional aspect of the instant disclosure, the second semantic context data may include one or more of the following data: data defining technical context in implementation of the application; data defining business context in implementation of the application; and data defining human-readable context in implementation of the application, but the disclosure is not limited thereto.

According to yet another aspect of the instant disclosure, wherein in converting the source code into the second semantic context data, the method may further include: converting the source code into abstract syntax tree utilizing a grammar tool according to a predefined programming language, wherein the abstract syntax tree includes a sequence of actions with their hierarchy in a given piece of code in the source code; and converting each sequence of action into corresponding word vector.

According to an additional aspect of the instant disclosure, wherein in converting the second semantic context data into the second semantic context vector, the method may further include converting each word vector into corresponding semantic context vector, wherein the semantic context vector describes what action the given piece of code is performing.

According to a further aspect of the instant disclosure, the method may further include training a machine learning model which receives a dataset of the word vectors as input the semantic context vectors as output.

According to an additional aspect of the present disclosure, the method may further include implementing a cosine similarity algorithm, wherein a degree of angle between a first line segment corresponding to the first semantic context vector and a second line segment corresponding to the second semantic context vector is directly proportional to how much the source code and the requirements data are in line with each other.

According to another aspect of the instant disclosure, a system for automatically generating a similarity matrix/score between intended requirements context data and source code context data corresponding to developing an application is disclosed. The system may include: a processor; and a memory operatively connected to the processor via a communication interface, the memory storing computer readable instructions, when executed, may cause the processor to: convert requirements data into a first semantic context data, wherein the requirements data describes intended tasks required for developing an application; convert the first semantic context data into a first semantic context vector; access a database that stores source code corresponding to implementation of the intended tasks required for developing the application; convert the source code into a second semantic context data; convert the second semantic context data into a second semantic context vector; compare the first semantic context vector and the second semantic context vector; automatically generate, in response to comparing, a similarity score that indicates how much the source code and the requirements data are in line with each other; and execute development of the application when it is determined that the similarity score is equal to or more than a predetermined threshold value.

According to yet another aspect of the instant disclosure, wherein in converting the source code into the second semantic context data, the processor may be further configured to: convert the source code into abstract syntax tree utilizing a grammar tool according to a predefined programming language, wherein the abstract syntax tree includes a sequence of actions with their hierarchy in a given piece of code in the source code; and convert each sequence of action into corresponding word vector.

According to a further aspect of the instant disclosure, wherein in converting the second semantic context data into the second semantic context vector, the processor may be further configured to: convert each word vector into corresponding semantic context vector, wherein the semantic context vector describes what action the given piece of code is performing.

According to an additional aspect of the present disclosure, the processor may be further configured to: train a machine learning model which receives a dataset of the word vectors as input the semantic context vectors as output.

According to another aspect of the present disclosure, wherein in generating the similarity score, the processor may be further configured to: implement a cosine similarity algorithm, wherein a degree of angle between a first line segment corresponding to the first semantic context vector and a second line segment corresponding to the second semantic context vector is directly proportional to how much the source code and the requirements data are in line with each other.

According to yet another aspect of the present disclosure, a non-transitory computer readable medium configured to store instructions for automatically generating a similarity matrix/score between intended requirements context data and source code context data corresponding to developing an application is disclosed. The instructions, when executed, cause a processor to perform the following: converting requirements data into a first semantic context data, wherein the requirements data describes intended tasks required for developing an application; converting the first semantic context data into a first semantic context vector; accessing a database that stores source code corresponding to implementation of the intended tasks required for developing the application; converting the source code into a second semantic context data; converting the second semantic context data into a second semantic context vector; comparing the first semantic context vector and the second semantic context vector; automatically generating, in response to comparing, a similarity score that indicates how much the source code and the requirements data are in line with each other; and executing development of the application when it is determined that the similarity score is equal to or more than a predetermined threshold value.

According to yet another aspect of the instant disclosure, wherein in converting the source code into the second semantic context data, the instructions, when executed, may further cause the processor to perform the following: converting the source code into abstract syntax tree utilizing a grammar tool according to a predefined programming language, wherein the abstract syntax tree includes a sequence of actions with their hierarchy in a given piece of code in the source code; and converting each sequence of action into corresponding word vector.

According to an additional aspect of the instant disclosure, wherein in converting the second semantic context data into the second semantic context vector, the instructions, when executed, may further cause the processor to perform the following: converting each word vector into corresponding semantic context vector, wherein the semantic context vector describes what action the given piece of code is performing.

According to a further aspect of the instant disclosure, the instructions, when executed, may further cause the processor to perform the following: training a machine learning model which receives a dataset of the word vectors as input the semantic context vectors as output.

According to an additional aspect of the present disclosure, the instructions, when executed, may further cause the processor to perform the following: implementing a cosine similarity algorithm, wherein a degree of angle between a first line segment corresponding to the first semantic context vector and a second line segment corresponding to the second semantic context vector is directly proportional to how much the source code and the requirements data are in line with each other.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
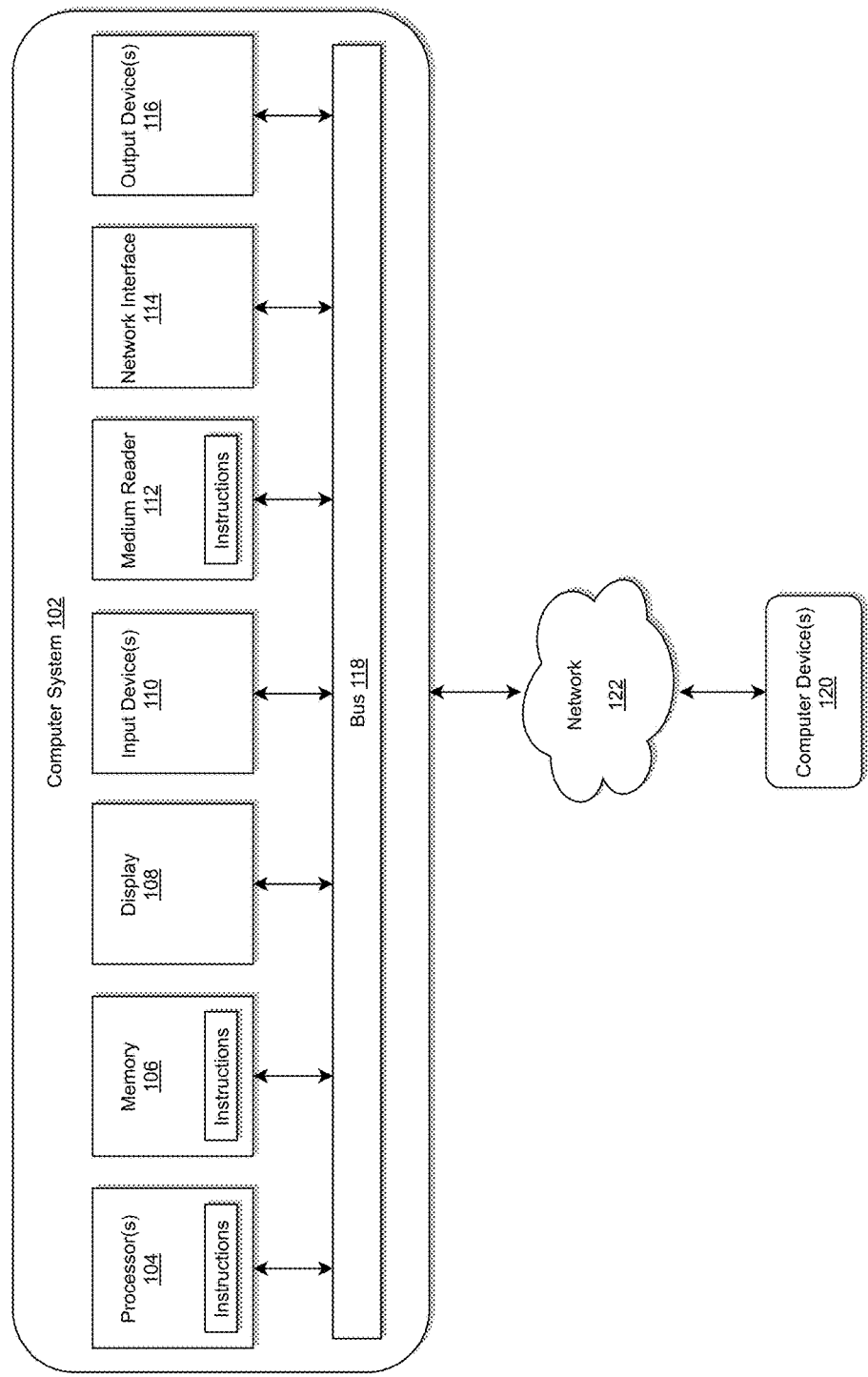
FIG. 1 illustrates a computer system for implementing a language agnostic application development module that is configured for automatically generating a similarity matrix/score between intended requirements context data and source code context data in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a language agnostic application development module that is configured for automatically generating a similarity matrix between intended requirements context data and source code context data in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
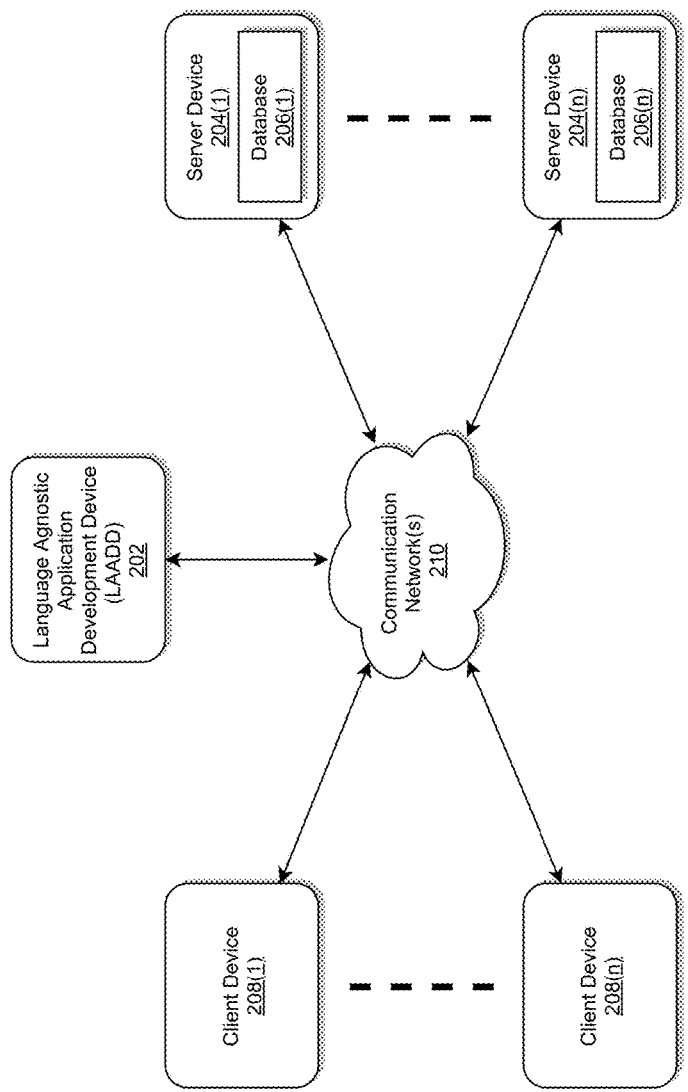
FIG. 2 illustrates an exemplary diagram of a network environment with a language agnostic application development device in accordance with an exemplary embodiment.

Referring to FIG. 2, a schematic of an exemplary network environment 200 for implementing a language agnostic application development device (LAADD) of the instant disclosure is illustrated.

According to exemplary embodiments, the above-described problems associated with conventional approach of developing, testing, or managing software application may be overcome by implementing a LAADD 202 as illustrated in FIG. 2 that may automatically generate a similarity matrix between intended requirements context data and source code context data and providing code suggestion, code improvement, percentage completion of intended tasks, code accuracy in developing an application, but the disclosure is not limited thereto.

The LAADD 202 may be the same or similar to the computer system 102 as described with respect to FIG. 1.

The LAADD 202 may store one or more applications that can include executable instructions that, when executed by the LAADD 202, cause the LAADD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LAADD 202 itself, may be located in virtual server(s) running in a cloud-based computing environment rather than being tied to one or more specific physical network computing devices. Also, the application(s) may be running in one or more virtual machines (VMs) executing on the LAADD 202. Additionally, in one or more embodiments of this technology, virtual machine(s) running on the LAADD 202 may be managed or supervised by a hypervisor.

In the network environment 200 of FIG. 2, the LAADD 202 is coupled to a plurality of server devices 204(1)-204(n) that hosts a plurality of databases 206(1)-206(n), and also to a plurality of client devices 208(1)-208(n) via communication network(s) 210. A communication interface of the LAADD 202, such as the network interface 114 of the computer system 102 of FIG. 1, operatively couples and communicates between the LAADD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LAADD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LAADD 202 may be a standalone device or integrated with one or more other devices or apparatuses, such as one or more of the server devices 204(1)-204(n), for example. In one particular example, the LAADD 202 may be hosted by one of the server devices 204(1)-204(n), and other arrangements are also possible. Moreover, one or more of the devices of the LAADD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LAADD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the LAADD 202 that may efficiently provide a platform for automatically generating a similarity matrix between intended requirements context data and source code context data and providing code suggestion, code improvement, percentage completion of intended tasks, code accuracy in developing an application, but the disclosure is not limited thereto.

The client devices 208(1)-208(n) may run interface applications, such as standard web browsers or standalone client applications, which may provide an interface to communicate with the LAADD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the LAADD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LAADD 202, the server devices 204(1)-204(n), or the client devices 208(1)-208(n), for example, may be configured to operate as virtual instances on the same physical machine. For example, one or more of the LAADD 202, the server devices 204(1)-204(n), or the client devices 208(1)-208(n) may operate on the same physical device rather than as separate devices communicating through communication network(s) 210. Additionally, there may be more or fewer LAADDs 202, server devices 204(1)-204(n), or client devices 208(1)-208(n) than illustrated in FIG. 2. According to exemplary embodiments, the LAADD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
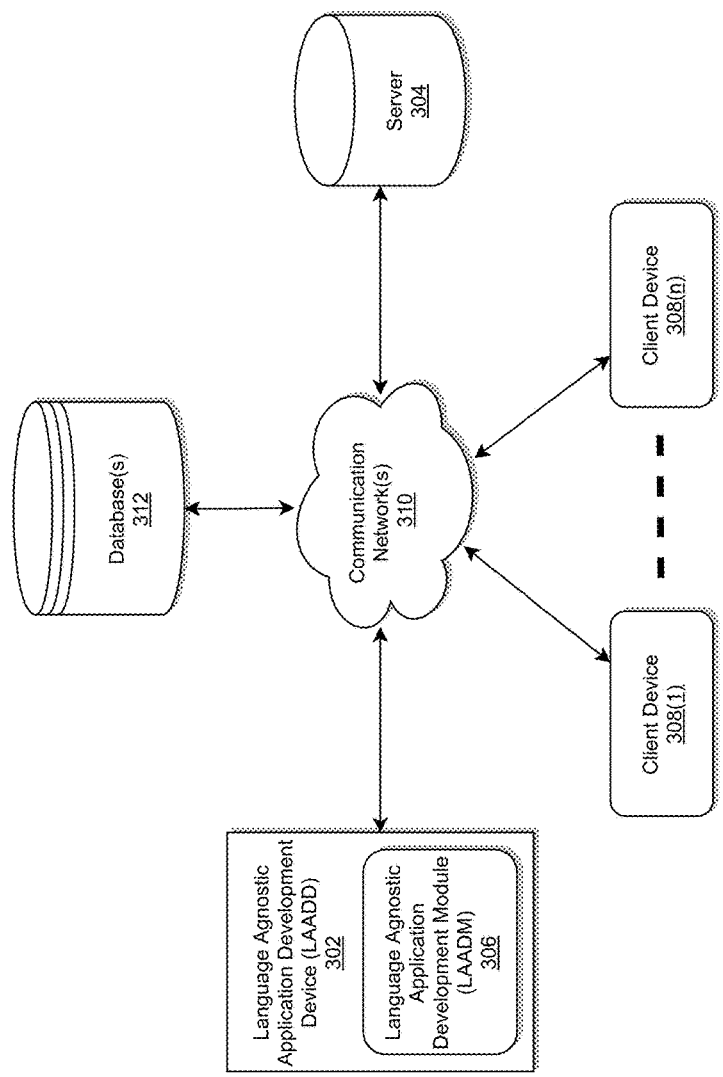
FIG. 3 illustrates a system diagram for implementing a language agnostic application development device having a language agnostic application development module in accordance with an exemplary embodiment.

FIG. 3 illustrates a system diagram for implementing a language agnostic application development device (LAADD) having a language agnostic application development module (LAADM) in accordance with an exemplary embodiment.

As illustrated in FIG. 3, the system 300 may include a LAADD 302 within which a LAADM 306 is embedded, a server 304, a database(s) 312, a plurality of client devices 308(1) . . . 308(n), and a communication network 310.

According to exemplary embodiments, the LAADD 302 including the LAADM 306 may be connected to the server 304, and the database(s) 312 via the communication network 310. The LAADD 302 may also be connected to the plurality of client devices 308(1) . . . 308(n) via the communication network 310, but the disclosure is not limited thereto.

According to exemplary embodiment, the LAADD 302 is described and shown in FIG. 3 as including the LAADM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the LAADM 306 may be configured to receive real-time feed of data from the plurality of client devices 308(1) . . . 308(n) via the communication network 310. According to exemplary embodiments, the database(s) 312 may store source code corresponding to developing an application.

As will be described below, the LAADM 306 may be configured to convert requirements data into a first semantic context data, the requirements data may describe describing intended tasks required for developing an application; convert the first semantic context data into a first semantic context vector; access a database (i.e., database(s) 312)) that stores source code corresponding to implementation of the intended tasks required for developing the application; convert the source code into a second semantic context data; convert the second semantic context data into a second semantic context vector; compare the first semantic context vector and the second semantic context vector; automatically generate, in response to comparing, a similarity score that indicates how much the source code and the requirements data are in line with each other; and execute development of the application when it is determined that the similarity score is equal to or more than a predetermined threshold value, but the disclosure is not limited thereto.

The plurality of client devices 308(1) . . . 308(n) are illustrated as being in communication with the LAADD 302.

In this regard, the plurality of client devices 308(1) . . . 308(n) may be "clients" of the LAADD 302 and are described herein as such. Nevertheless, it is to be known and understood that the plurality of client devices 308(1) . . . 308(n) need not necessarily be "clients" of the LAADD 302, or any entity described in association therewith herein. Any additional or alternative relationship may exist between either or both of the plurality of client devices 308(1) . . . 308(n) and the LAADD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the LAADD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The LAADD 302 may be the same or similar to the LAADD 202 as described with respect to FIG. 2, including any features or combination of features described with respect thereto.

Figure 4:
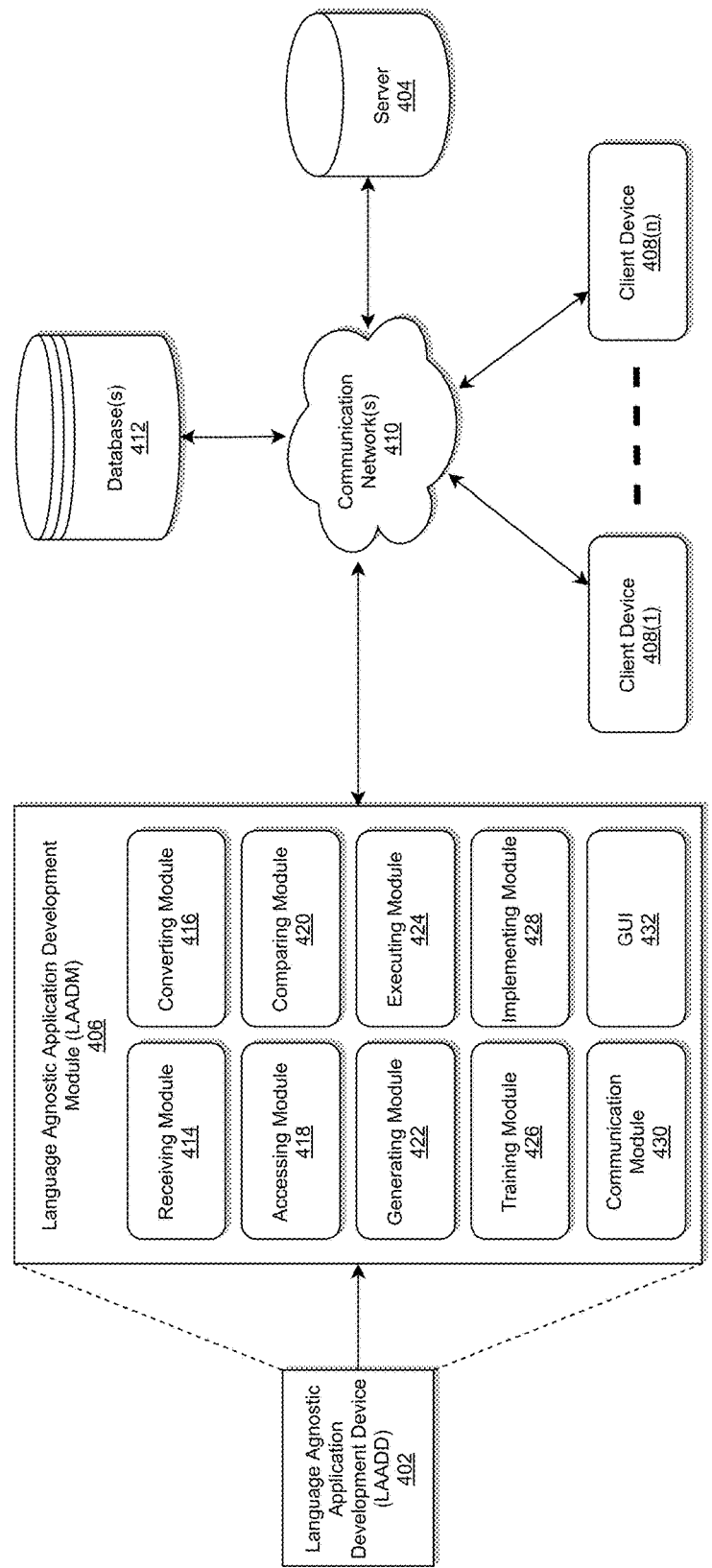
FIG. 4 illustrates a system diagram for implementing a language agnostic application development module of FIG. 3 in accordance with an exemplary embodiment.

FIG. 4 illustrates a system diagram for implementing a language agnostic application development module (LAADM) of FIG. 3 in accordance with an exemplary embodiment.

According to exemplary embodiments, the system 400 may include a language agnostic application development device (LAADD) 402 within which a LAADM 406 is embedded, a server 404, database(s) 412, and a communication network 410.

According to exemplary embodiments, the LAADD 402 including the LAADM 406 may be connected to the server 404 and the database(s) 412 via the communication network 410. The LAADD 402 may also be connected to the plurality of client devices 408(1)-408(n) via the communication network 410, but the disclosure is not limited thereto. The LAADM 406, the server 404, the plurality of client devices 408(1)-408(n), the database(s) 412, the communication network 410 as illustrated in FIG. 4 may be the same or similar to the LAADM 306, the server 304, the plurality of client devices 308(1)-308(n), the database(s) 312, the communication network 310, respectively, as illustrated in FIG. 3.

According to exemplary embodiments, as illustrated in FIG. 4, the LAADM 406 may include a receiving module 414, a converting module 416, an accessing module 418, a comparing module 420, a generating module 422, an executing module 424, a training module 426, an implementing module 428, a communication module 430, and a graphical user interface (GUI) 432.

According to exemplary embodiments, each of the receiving module 414, converting module 416, accessing module 418, comparing module 420, generating module 422, executing module 424, training module 426, implementing module 428, and the communication module 430 of the LAADM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, converting module 416, accessing module 418, comparing module 420, generating module 422, executing module 424, training module 426, implementing module 428, and the communication module 430 of the LAADM 406 may be implemented by microprocessors or similar, and may be programmed using software (e.g., microcode) to perform various functions discussed herein and may optionally be driven by firmware and/or software.

Alternatively, according to exemplary embodiments, each of the receiving module 414, converting module 416, accessing module 418, comparing module 420, generating module 422, executing module 424, training module 426, implementing module 428, and the communication module 430 of the LAADM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, converting module 416, accessing module 418, comparing module 420, generating module 422, executing module 424, training module 426, implementing module 428, and the communication module 430 of the LAADM 406 may be called via corresponding API.

The process may be executed via the communication module 430 and the communication network 410, which may comprise plural networks as described above. For example, in an exemplary embodiment, the various components of the AAM 406 may communicate with the server 404, and the database(s) 412 via the communication module 430 and the communication network 410. Of course, these embodiments are merely exemplary and are not limiting or exhaustive.

According to exemplary embodiments, the communication network 410 and the communication module 430 may be configured to establish a link between the database(s) 412, the client devices 408(1)-408(n) and the AAM 406.

Figure 5:
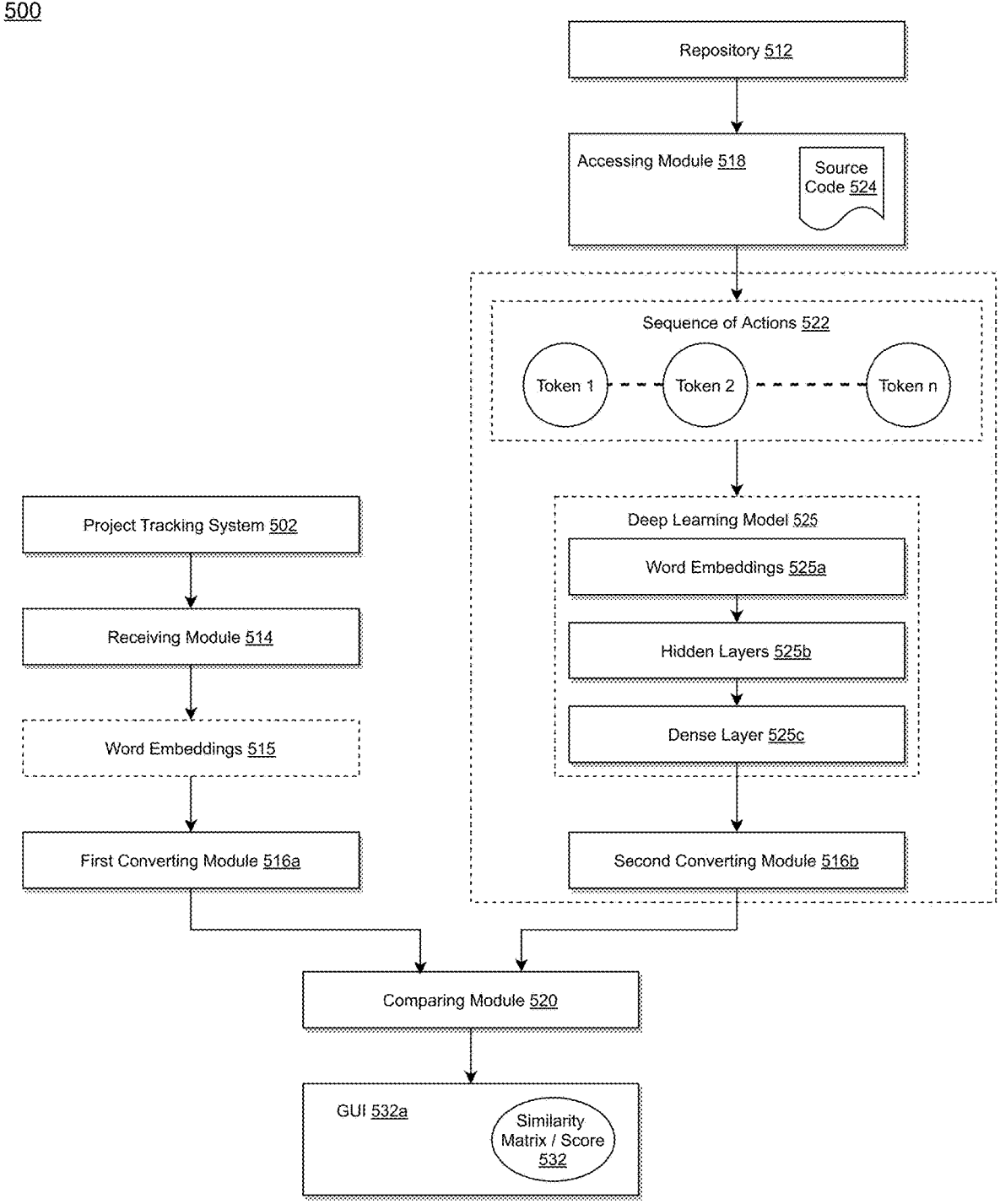
FIG. 5 illustrates an exemplary similarity score generating architecture implemented by the language agnostic application development module of FIG. 4 in accordance with an exemplary embodiment.

FIG. 5 illustrates an exemplary similarity score generating architecture 500 implemented by the LAADM 406 of FIG. 4 in accordance with an exemplary embodiment. As illustrated in the exemplary similarity score generating architecture 500, a project tracking system 502 may be operatively connected to a receiving module 514 which may obtain requirements data (i.e., JIRA stories, but the disclosure is not limited thereto) corresponding to developing an application from the project tracking system 502. The receiving module 514 may be the same or similar to the receiving module 414 as illustrated in FIG. 4.

According to exemplary embodiments, the requirements data received by the receiving module 514 may undergo transformation by adding desired word embeddings 515 prior to transferring the requirements data to a first converting module 516a. The first converting module 516a may be the same or similar to the converting module 416 as illustrated in FIG. 4. The first converting module 516a may be configured to convert the requirements data into a semantic context data (i.e., JIRA story semantic representation, but the disclosure is not limited thereto). The first converting module 516a then converts the semantic context data into a semantic context vector (i.e., document vector, but the disclosure is not limited thereto) and transfers the semantic context vector to a comparing module 520. The comparing module 520 may be the same or similar to the comparing module 420 as illustrated in FIG. 4.

According to exemplary embodiments, FIG. 5 also illustrates a repository 512 that may store source code 524 in connection with developing applications. The repository 512 may be the same or similar to the database(s) 412 as illustrated in FIG. 4.

As illustrated in FIG. 5, according to exemplary embodiments, the accessing module 518 may be configured to access the repository 512 and obtain the source code 524. The source code 524 may be tokenized into sequence of actions 522 where a machine learning model 525 may be trained which receives a large dataset of the word vectors as input and the semantic context vectors as output. The architecture of the machine learning model 525 may include word embeddings 525a section, hidden layers 525b section, and dense layer 525c section. Data from the word embeddigns 525a section may be input to the hidden layers 525b section; data from the hidden layers 525b section may be input to the dense layer 525c section. Output from the machine learning model 525 may be input to a second converting module 516b for converting the source code 524 into a source code semantic context data and then converting the source code semantic context data into a source code semantic context vector (i.e., program vector). These program vectors are sent to the comparing module 520 which compares the program vectors with the document vector by implementing cosine similarity/distance algorithm. Based on the results of comparing, a similarity matrix/score 532 is automatically generated and displayed on a GUI 532a. The GUI 532a may be the same or similar to the GUI 432 as illustrated in FIG. 4. According to exemplary embodiments, the sequence of actions 522, machine learning model 525, and the second converting module 516b may all be components of a single module.

Figure 6:
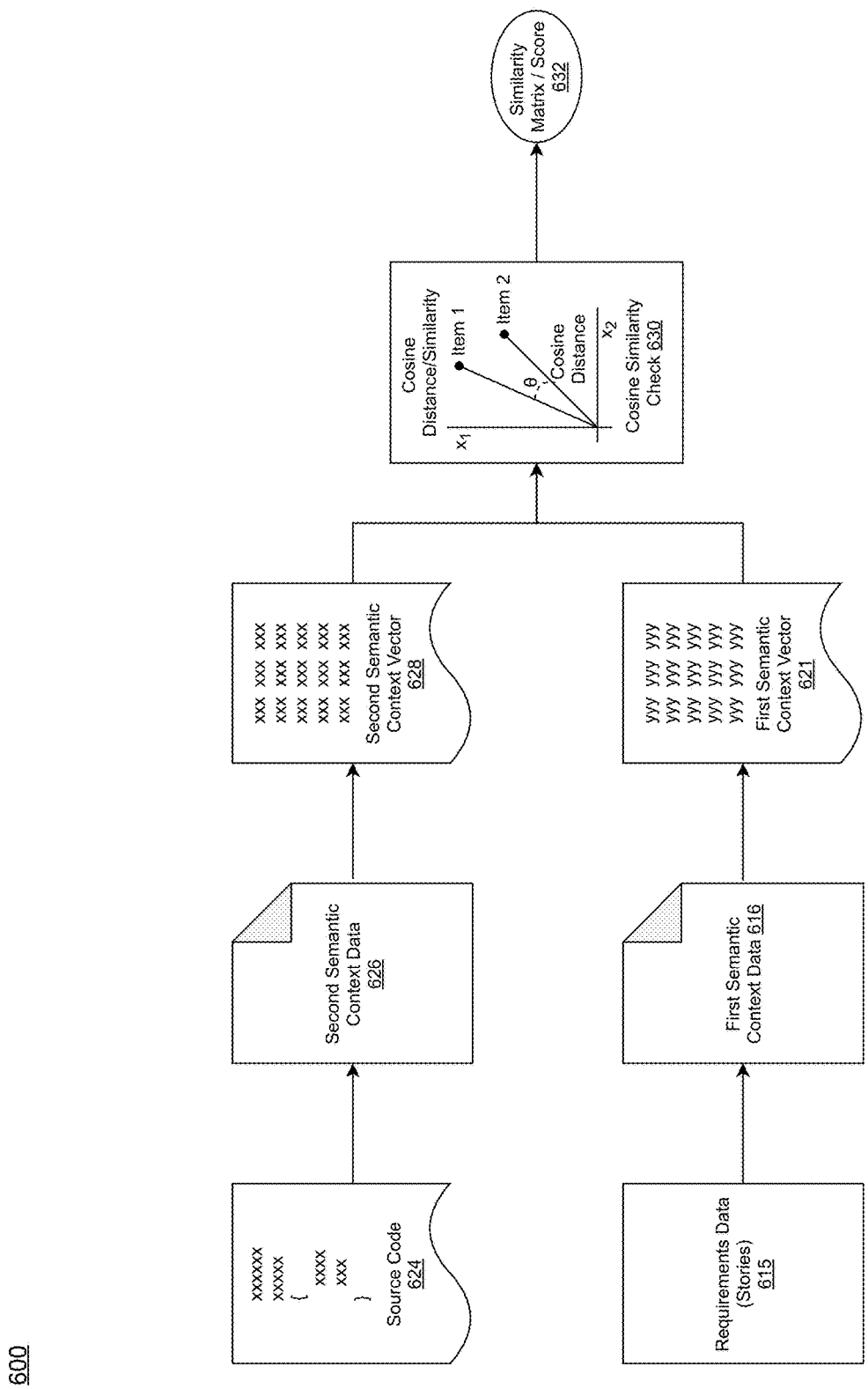
FIG. 6 illustrates an exemplary flow chart of generating a similarity score utilizing the architecture of FIG. 5 in accordance with an exemplary embodiment.

FIG. 6 illustrates an exemplary flow chart 600 of generating a similarity score implemented by the LAADM 406 utilizing the architecture 500 of FIG. 5 in accordance with an exemplary embodiment. In FIG. 6, the flow chart 600 illustrates requirements data (i.e., JIRA stories, but the disclosure is not limited thereto), first semantic context data 616, first semantic context vector 621, source code 624, second semantic context data 626, second semantic context vector 628, cosine similarity check 630, and similarity matrix/score 632.

More detailed explanations of how the similarity matrix/score 632 is being automatically generated will be described below referring to FIGS. 4-6.

According to exemplary embodiments the receiving module 414, 514 may be configured to receive requirements data 615 (i.e., JIRA stories, but the disclosure is not limited thereto) that describes intended tasks required for developing an application. According to exemplary embodiments, the requirements data 615 may be obtained from the project tracking system 502 (i.e., JIRA, but the disclosure is not limited thereto) that is being utilized to create intended tasks (i.e., JIRA stories) for completing/developing an application.

According to exemplary embodiments, the first converting module 516a may be configured to convert requirements data 615 into a first semantic context data 616 and convert the first semantic context data 616 into a first semantic context vector 621.

According to exemplary embodiments, the accessing module 418, 518 may be configured to access a database (i.e., database(s) 412 as illustrated in FIG. 4 or repository 512 as illustrated in FIG. 5) that stores source code 524, 624 corresponding to implementation of the intended tasks required for developing the application. According to exemplary embodiments, the source code 524, 624 may include one or more of the following codes: code developed in fulfilling the intended tasks; and pre-given code that is needed to be modified for developing the application, but the disclosure is not limited thereto.

According to exemplary embodiments, the second converting module 516b may be configured to convert the source code 524, 624 into a second semantic context data 626 and convert the second semantic context data 626 into a second semantic context vector 628.

According to exemplary embodiments, the first semantic context data 616 may include one or more of the following data: data defining technical context in developing the application; data validating intended tasks readiness for execution in developing the application; data identifying duplicate intended tasks in developing the application, but the disclosure is not limited thereto.

According to exemplary embodiments, the second semantic context data 626 may include one or more of the following data: data defining technical context in implementation of the application; data defining business context in implementation of the application; and data defining human-readable context in implementation of the application, but the disclosure is not limited thereto.

According to exemplary embodiments, the comparing module 420, 520 may be configured to compare the first semantic context vector 621 and the second semantic context vector 628. The generating module 422 may be configured to automatically generate, in response to comparing, a similarity matrix/score 532, 632 that indicates how much the source code 524, 624 and the requirements data 615 are in line with each other.

According to exemplary embodiments, the executing module 424 may be configured to execute development of the application when it is determined that the similarity score/matrix 532, 632 is equal to or more than a predetermined threshold value.

According to exemplary embodiments, in converting the source code 524, 624 into the second semantic context data 626, the second converting module 516b may be configured to convert the source code 524, 624 into abstract syntax tree utilizing a grammar tool according to a predefined programming language. The abstract syntax tree may include a sequence of actions 522 as illustrated in FIG. 5 with their hierarchy in a given piece of code in the source code. As illustrated in FIG. 5, the sequence of actions 522 includes tokenized code, i.e., token 1, token 2, . . . token n, generated based on the source code 524, 624. The second converting module 516b then converts each sequence of action into corresponding word vector.

According to exemplary embodiments, in converting the second semantic context data 626 into the second semantic context vector 628, the second converting module 516b may be configured to convert each word vector into corresponding semantic context vector, the semantic context vector describing what action the given piece of code is performing.

According to exemplary embodiments, the training module 426 may be configured to train the machine learning model 524 which receives a large dataset of the word vectors as input and outputs the semantic context vectors (i.e., the second semantic context vector 628).

According to exemplary embodiments, the implementing module 428 may be configured to implement a cosine similarity algorithm (i.e., cosine similarity check 630 as illustrated in FIG. 6), wherein a degree of angle θ between a first line segment (i.e., item 1 as illustrated in FIG. 6) corresponding to the first semantic context vector 621 and a second line segment (i.e., item 2 as illustrated in FIG. 6) corresponding to the second semantic context vector 628 is directly proportional to how much the source code 524, 624 and the requirements data 615 are in line with each other. For example, if the angle θ is 90 degrees, then the output displayed in the GUI 432, 532*a* may represent that the source code 524, 624 and the requirements data 615 are completely in line (i.e., 100% match) with each other. If the angle θ is 180 degrees, then the output displayed in the GUI 432, 532*a* may represent that the source code 524, 624 and the requirements data 615 are completely in opposite, i.e., the source code 524, 624 does not match at all (i.e., 0%) with the requirements data 615. On the other hand, if the angle θ is 60 degrees, then the output displayed in the GUI 432, 532*a* may represent that the source code 524, 624 is 50% in line with the with the requirements data 615. These 0%, 50%, 100% are described herein as examples only, but the disclosure is not limited to these examples. According to exemplary embodiments, the predefined threshold value for executing development of the application may be when there is an 85% match between the source code 524, 624 and the requirements data 615, but the disclosure is not limited thereto. Any desired percentage value may be set as the predefined threshold value depending on user's need, desired business requirements, or desired technical requirements.

Thus, according to exemplary embodiments, the LAADM 406 may be configured to recommending the nearest/closet code snippet's from a code repository based on the semantic context; proposing design document and estimated efforts for completion based on the semantic context; automatically updating/amending of acceptance criteria based on code commit by a developer; validating the semantic context of requirements data and code check-in's and providing a percentage of development completion, etc., but the disclosure is not limited thereto. For example, the LAADM 406 may be configured to generate an output that can tell the amount of code implemented and estimate the required efforts to complete the task, i.e., schedule variance; can recommend the best possible approach from the trained user for that particular task, etc., but the disclosure is not limited thereto.

Figure 7:
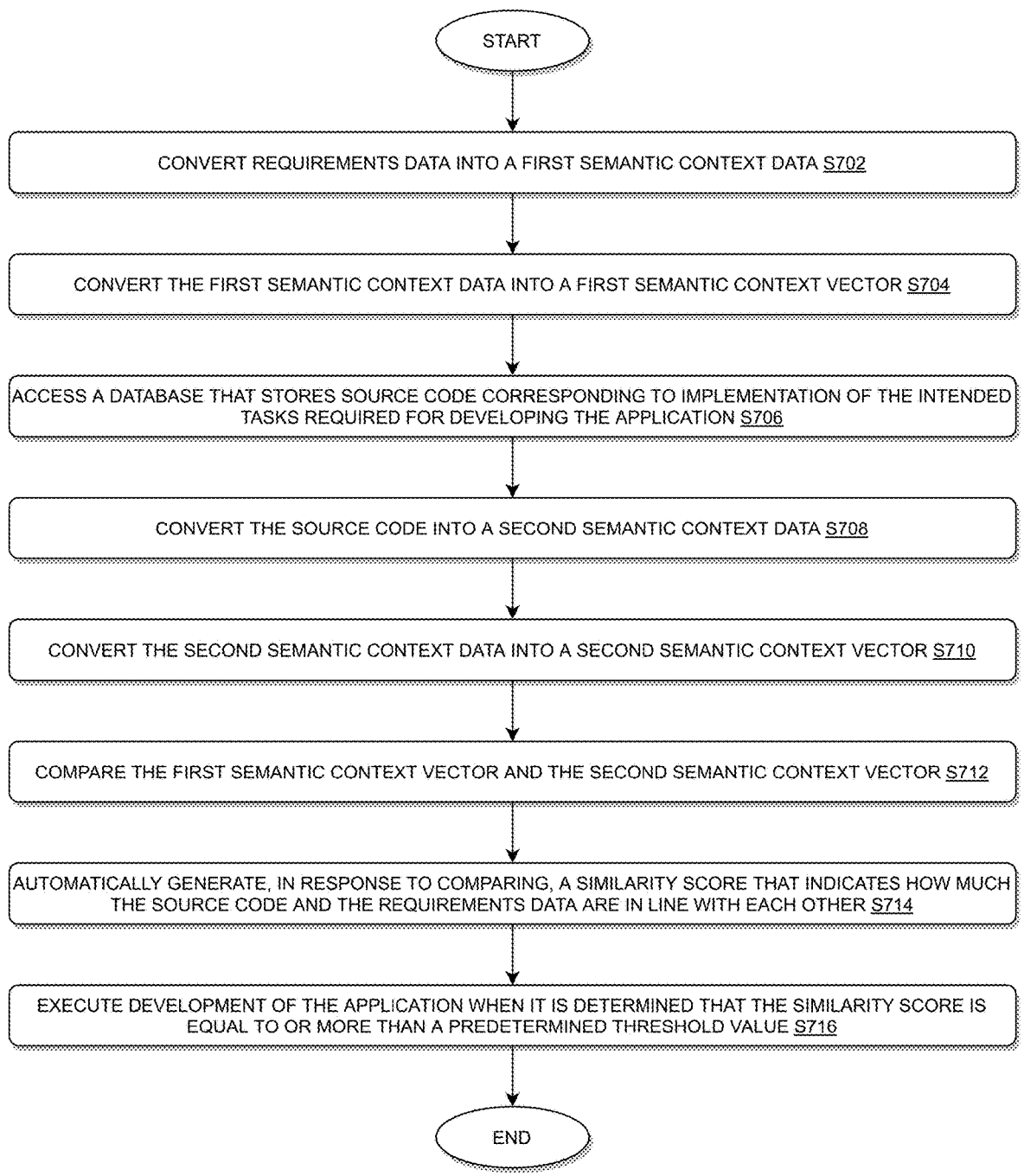
FIG. 7 illustrates a flow chart for implementing a language agnostic application development module that is configured for automatically generating a similarity matrix/score between intended requirements context data and source code context data in accordance with an exemplary embodiment.

FIG. 7 illustrates a flow chart of a process 700 for implementing a language agnostic application development module that is configured for automatically generating a similarity matrix between intended requirements context data and source code context data in accordance with an exemplary embodiment. It will be appreciated that the illustrated process 500 and associated steps may be performed in a different order, with illustrated steps omitted, with additional steps added, or with a combination of reordered, combined, omitted, or additional steps.

As illustrated in FIG. 7, at step S702, the process 700 may include converting requirements data into a first semantic context data. The requirements data may describe intended tasks required for developing an application. The first semantic context data may include one or more of the following data: data defining technical context in developing the application; data validating intended tasks readiness for execution in developing the application; data identifying duplicate intended tasks in developing the application, but the disclosure is not limited thereto At step S704, the process 700 may include converting the first semantic context data into a first semantic context vector.

At step S706, the process 700 may include accessing a database that stores source code corresponding to implementation of the intended tasks required for developing the application. The source code may include one or more of the following codes: code developed in fulfilling the intended tasks; and pre-given code that is needed to be modified for developing the application, but the disclosure is not limited thereto.

At step S708, the process 700 may include converting the source code into a second semantic context data. The second semantic context data may include one or more of the following data: data defining technical context in implementation of the application; data defining business context in implementation of the application; and data defining human-readable context in implementation of the application, but the disclosure is not limited thereto.

At step S710, the process 700 may include converting the second semantic context data into a second semantic context vector.

At step S712, the process 700 may include comparing the first semantic context vector and the second semantic context vector.

At step S714, the process 700 may include automatically generating, in response to comparing, a similarity score that indicates how much the source code and the requirements data are in line with each other.

At step S716, the process 700 may include executing development of the application when it is determined that the similarity score is equal to or more than a predetermined threshold value.

According to exemplary embodiments, in converting the source code into the second semantic context data, the process 700 may further include: converting the source code into abstract syntax tree utilizing a grammar tool according to a predefined programming language, wherein the abstract syntax tree includes a sequence of actions with their hierarchy in a given piece of code in the source code; and converting each sequence of action into corresponding word vector.

According to exemplary embodiments, in converting the second semantic context data into the second semantic context vector, the process 700 may further include converting each word vector into corresponding semantic context vector, wherein the semantic context vector describes what action the given piece of code is performing.

According to exemplary embodiments, the process 700 may further include: training a machine learning model which receives a dataset of the word vectors as input the semantic context vectors as output.

According to exemplary embodiments, the process 700 may further include implementing a cosine similarity algorithm, wherein a degree of angle between a first line segment corresponding to the first semantic context vector and a second line segment corresponding to the second semantic context vector is directly proportional to how much the source code and the requirements data are in line with each other.

According to exemplary embodiments, the LAADD 402 may include a memory (e.g., a memory 106 as illustrated in FIG. 1) which may be a non-transitory computer readable medium that may be configured to store instructions for automatically generating a similarity matrix/score between intended requirements context data and source code context data corresponding to developing an application as disclosed herein. The LAADD 402 may also include a medium reader (e.g., a medium reader 112 as illustrated in FIG. 1) which may be configured to read any one or more sets of instructions, e.g., software, from any of the memories described herein. The instructions, when executed by a processor embedded within the LAADM 406 or within the LAADD 402, may be used to perform one or more of the methods and processes as described herein. In a particular embodiment, the instructions may reside completely, or at least partially, within the memory 106, the medium reader 112, and/or the processor 104 (see FIG. 1) during execution by the LAADD 402.

According to exemplary embodiments, the instructions, when executed, may cause a processor embedded within the LAADM 406, 506 or the LAADD 402 to perform the following: converting requirements data into a first semantic context data, wherein the requirements data describes intended tasks required for developing an application; converting the first semantic context data into a first semantic context vector; accessing a database that stores source code corresponding to implementation of the intended tasks required for developing the application; converting the source code into a second semantic context data; converting the second semantic context data into a second semantic context vector; comparing the first semantic context vector and the second semantic context vector; automatically generating, in response to comparing, a similarity score that indicates how much the source code and the requirements data are in line with each other; and executing development of the application when it is determined that the similarity score is equal to or more than a predetermined threshold value. The processor may be the same or similar to the processor 104 as illustrated in FIG. 1 or the processor embedded within LAADD 202, LAADD 302, LAADD 402, and LAADM 406.

According to exemplary embodiments, in converting the source code into the second semantic context data, the instructions, when executed, may further cause the processor 104 to perform the following: converting the source code into abstract syntax tree utilizing a grammar tool according to a predefined programming language, wherein the abstract syntax tree includes a sequence of actions with their hierarchy in a given piece of code in the source code; and converting each sequence of action into corresponding word vector.

According to exemplary embodiments, in converting the second semantic context data into the second semantic context vector, the instructions, when executed, may further cause the processor 104 to perform the following: converting each word vector into corresponding semantic context vector, wherein the semantic context vector describes what action the given piece of code is performing.

According to exemplary embodiments, the instructions, when executed, may further cause the processor 104 to perform the following: training a machine learning model which receives a dataset of the word vectors as input the semantic context vectors as output.

According to exemplary embodiments, the instructions, when executed, may further cause the processor 104 to perform the following: implementing a cosine similarity algorithm, wherein a degree of angle between a first line segment corresponding to the first semantic context vector and a second line segment corresponding to the second semantic context vector is directly proportional to how much the source code and the requirements data are in line with each other.

According to exemplary embodiments as disclosed above in FIGS. 1-7, technical improvements effected by the instant disclosure may include a platform for implementing a platform and language agnostic smart resiliency module/tool/framework for creating a workflow-based plug and play framework configured for assisting all applications with automatic execution of scripts to aid in failover process, but the disclosure is not limited thereto.

For example, according to exemplary embodiments as disclosed above in FIGS. 1-7, technical improvements effected by the instant disclosure may include a platform that may also provide optimized processes of implementing a language agnostic application development module/tool/framework that is configured for automatically generating a similarity matrix between intended requirements context data and source code context data and providing code suggestion, code improvement, percentage completion of intended tasks, code accuracy in developing an application, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for developing an application by utilizing one or more processors and one or more memories, the method comprising:

converting requirements data into a first semantic context data, wherein the requirements data describes intended tasks required for developing an application, wherein the first semantic context data includes data defining technical context in developing the application, data validating intended tasks readiness for execution in developing the application, and data identifying duplicate intended tasks in developing the application;

converting the first semantic context data into a first semantic context vector;

accessing a database that stores source code corresponding to implementation of the intended tasks required for developing the application;

tokenizing the source code into sequence of actions;

training a machine learning model which receives a large dataset of word vectors as input and provides semantic context vectors as output, wherein an architecture of the machine learning model includes word embeddings section, hidden layers section, and dense layer section, and wherein data from the word embeddings section is input to the hidden layers section and data from the hidden layers section is input to the dense layer section, and wherein output from the machine learning model is input to a converter;

converting, by the converter, the source code into a second semantic context data;

converting, by the converter, the second semantic context data into a second semantic context vector, wherein the second semantic context vector describes an action performed by the source code;

comparing the first semantic context vector and the second semantic context vector;

automatically generating, in response to the comparing, a similarity score that indicates how much the source code and the requirements data are in line with each other;

determining, based on a result of the comparing, an amount of remaining source code necessary for completing the intended tasks required for the developing of the application;

recommending, based on the result of the comparing, an approach to further align the source code and the requirements data; and executing development of the application when it is determined that the similarity score is equal to or more than a predetermined threshold value.

2. The method according to claim 1, wherein the source code includes one or more of the following codes:

code developed in fulfilling the intended tasks; and pre-given code that is needed to be modified for developing the application.

3. The method according to claim 1, wherein the second semantic context data includes one or more of the following data:

data defining technical context in implementation of the application;

data defining business context in implementation of the application; and data defining human-readable context in implementation of the application.

4. The method according to claim 1, wherein in converting the source code into the second semantic context data, the method further comprising:
converting the source code into abstract syntax tree utilizing a grammar tool according to a predefined programming language, wherein the abstract syntax tree includes a sequence of actions with their hierarchy in a given piece of code in the source code; and
converting each sequence of action into corresponding word vector.

5. The method according to claim 4, wherein in converting the second semantic context data into the second semantic context vector, the method further comprising:
converting each word vector into corresponding semantic context vector, wherein the corresponding semantic context vector describes what action the given piece of code is performing.

6. The method according to claim 1, wherein in generating the similarity score, the method further comprising:
implementing a cosine similarity algorithm, wherein a degree of angle between a first line segment corresponding to the first semantic context vector and a second line segment corresponding to the second semantic context vector is directly proportional to how much the source code and the requirements data are in line with each other.

7. The method according to claim 1, further comprising:
determining, based on the result of the comparing, a closest corresponding source code snippet from a code repository to further align the source code and the requirements data; and
recommending the closest corresponding source code snippet.

8. The method according to claim 1, further comprising:
implementing a platform and a language agnostic resiliency module to create a workflow-based framework for assisting in an automatic execution of scripting to facilitate a failover process.

9. The method according to claim 1, further comprising:
implementing a platform and a language agnostic application development module for automatically generating a similarity matrix between intended requirements context data and source code context data, and wherein the platform and the language agnostic application development module are used to determine, based on a result of the generated similarity matrix, accuracy of the source code associated with the developing of the application.

10. The method according to claim 1, further comprising:
generating, based on the result of the comparing, improvements to the source code for the developing of the application.

11. A system for developing an application, the system comprising:
a processor; and
a memory operatively connected to the processor via a communication interface, the memory storing computer readable instructions, when executed, causes the processor to:
convert requirements data into a first semantic context data, wherein the requirements data describes intended tasks required for developing an application, wherein the first semantic context data includes data defining technical context in developing the application, data validating intended tasks readiness for execution in developing the application, and data identifying duplicate intended tasks in developing the application;
convert the first semantic context data into a first semantic context vector;
access a database that stores source code corresponding to implementation of the intended tasks required for developing the application;
tokenize the source code into sequence of actions;
train a machine learning model which receives a large dataset of word vectors as input and provides semantic context vectors as output, wherein an architecture of the machine learning model includes word embeddings section, hidden layers section, and dense layer section, and wherein data from the word embeddings section is input to the hidden layers section and data from the hidden layers section is input to the dense layer section, and wherein output from the machine learning model is input to a converter;
convert, by utilizing the converter, the source code into a second semantic context data;
convert, by utilizing the converter, the second semantic context data into a second semantic context vector, wherein the second semantic context vector describes an action performed by the source code;
compare the first semantic context vector and the second semantic context vector;
automatically generate, in response to the comparing, a similarity score that indicates how much the source code and the requirements data are in line with each other;
determine, based on a result of the comparing, an amount of remaining source code necessary for completing the intended tasks required for the developing of the application;
recommend, based on the result of the comparing, an approach to further align the source code and the requirements data; and
execute development of the application when it is determined that the similarity score is equal to or more than a predetermined threshold value.

12. The system according to claim 11, wherein the source code includes one or more of the following codes:
code developed in fulfilling the intended tasks; and
pre-given code that is needed to be modified for developing the application.

13. The system according to claim 11, wherein the second semantic context data includes one or more of the following data:
data defining technical context in implementation of the application;
data defining business context in implementation of the application; and
data defining human-readable context in implementation of the application.

14. The system according to claim 11, wherein in converting the source code into the second semantic context data, the processor is further configured to:
convert the source code into abstract syntax tree utilizing a grammar tool according to a predefined programming language, wherein the abstract syntax tree includes a sequence of actions with their hierarchy in a given piece of code in the source code; and
convert each sequence of action into corresponding word vector.

15. The system according to claim 14, wherein in converting the second semantic context data into the second semantic context vector, the processor is further configured to:

convert each word vector into corresponding semantic context vector, wherein the corresponding semantic context vector describes what action the given piece of code is performing.

16. The system according to claim 11, wherein in generating the similarity score, the processor is further configured to:
   implement a cosine similarity algorithm, wherein a degree of angle between a first line segment corresponding to the first semantic context vector and a second line segment corresponding to the second semantic context vector is directly proportional to how much the source code and the requirements data are in line with each other.

17. A non-transitory computer readable medium configured to store instructions for developing an application, wherein, when executed, the instructions cause a processor to perform the following:
   converting requirements data into a first semantic context data, wherein the requirements data describes intended tasks required for developing an application, wherein the first semantic context data includes data defining technical context in developing the application, data validating intended tasks readiness for execution in developing the application, and data identifying duplicate intended tasks in developing the application;
   converting the first semantic context data into a first semantic context vector;
   accessing a database that stores source code corresponding to implementation of the intended tasks required for developing the application;
   tokenizing the source code into sequence of actions;
   training a machine learning model which receives a large dataset of word vectors as input and provides semantic context vectors as output, wherein an architecture of the machine learning model includes word embeddings section, hidden layers section, and dense layer section, and wherein data from the word embeddings section is input to the hidden layers section and data from the hidden layers section is input to the dense layer section, and wherein output from the machine learning model is input to a converter;
   converting, by the converter, the source code into a second semantic context data;
   converting, by the converter, the second semantic context data into a second semantic context vector, wherein the second semantic context vector describes an action performed by the source code;
   comparing the first semantic context vector and the second semantic context vector;
   automatically generating, in response to the comparing, a similarity score that indicates how much the source code and the requirements data are in line with each other;
   determining, based on a result of the comparing, an amount of remaining source code necessary for completing the intended tasks required for the developing of the application;
   recommending, based on the result of the comparing, an approach to further align the source code and the requirements data; and
   executing development of the application when it is determined that the similarity score is equal to or more than a predetermined threshold value.

18. The non-transitory computer readable medium according to claim 17, wherein:
   the source code includes one or more of the following codes:
      code developed in fulfilling the intended tasks; and
      pre-given code that is needed to be modified for the developing of the application; and
   the second semantic context data includes one or more of the following data:
      data defining technical context in implementation of the application;
      data defining business context in implementation of the application; and
      data defining human-readable context in implementation of the application.

19. The non-transitory computer readable medium according to claim 17, wherein, the instructions, when executed, further cause the processor to perform the following:
   converting the source code into abstract syntax tree utilizing a grammar tool according to a predefined programming language, wherein the abstract syntax tree includes a sequence of actions with their hierarchy in a given piece of code in the source code;
   converting each sequence of action into corresponding word vector; and
   converting each word vector into corresponding semantic context vector, wherein the corresponding semantic context vector describes what action the given piece of code is performing.

20. The non-transitory computer readable medium according to claim 17, wherein, in generating the similarity score, the instructions, when executed, further cause the processor to perform the following:
   implementing a cosine similarity algorithm, wherein a degree of angle between a first line segment corresponding to the first semantic context vector and a second line segment corresponding to the second semantic context vector is directly proportional to how much the source code and the requirements data are in line with each other.

* * * * *